(12) United States Patent
Ko

(10) Patent No.: US 7,543,353 B2
(45) Date of Patent: Jun. 9, 2009

(54) BLADE FOR WINDSHIELD WIPER OF AUTOMOBILE

(75) Inventor: Byung-Hun Ko, Daegu (KR)

(73) Assignee: CAP Corp., Taegu (KR)

( * ) Notice: Subject to any disclaimer, the term of this patent is extended or adjusted under 35 U.S.C. 154(b) by 0 days.

(21) Appl. No.: 11/813,745

(22) PCT Filed: Jul. 12, 2005

(86) PCT No.: PCT/KR2005/002237

§ 371 (c)(1),
(2), (4) Date: Jul. 11, 2007

(87) PCT Pub. No.: WO2006/088274

PCT Pub. Date: Aug. 24, 2006

(65) Prior Publication Data

US 2008/0201894 A1    Aug. 28, 2008

(51) Int. Cl.
*B60S 1/38* (2006.01)
(52) U.S. Cl. .............................. 15/250.201; 15/250.43
(58) Field of Classification Search ............ 15/250.201, 15/250.43, 250.44, 250.361, 250.32
See application file for complete search history.

(56) References Cited

U.S. PATENT DOCUMENTS 3,088,155 A * 5/1963 Smithers ................ 15/250.201

6,836,924 B2 * 1/2005 Egan-Walter ............ 15/250.04
2004/0181894 A1 * 9/2004 Lee et al. ............... 15/250.201

* cited by examiner

*Primary Examiner*—Gary K Graham
(74) *Attorney, Agent, or Firm*—John K. Park; Park Law Firm

(57) ABSTRACT

This invention pertains to a windshield wiper blade apparatus for a motor vehicle that more effectively and perfectly completely clears away rainwater or and foreign objects, which stick to on the car windshield, with more definite contact force and without shaking. Also Furthermore, this invention more definitely clearly improves the organic coupling structure of the components that constitute the blade apparatus. More specifically, the blade (300) is inserted into the blade couplingblade-couplingunit (10) that is fixed to the rail spring (100); the clamp (400) is coupled to the rail spring (100) through four hook project ions (132) that are formed in the rail spring. The clamp has four coupling protrusions (410) in its lower part, and each coupling protrusion has a hook hole (411) Hence Therefore, the coupling protrusions (410) hook holes (411) hook grooves (131) and hook projections (132) form the clamp-coupling unitpart (130); the spoiler has multiple clip installation sections (210) with grooves for to prevention of the spoilerit from breaking away (211) on its both sides. The clips for to prevention of the spoiler from it breaking away (220) are inserted into the clip installation sections, The clips are to prevent the spoiler from breaking away by pressing holding the spoiler and part of the rail spring up and downtogether.

8 Claims, 5 Drawing Sheets

[Fig. 2]
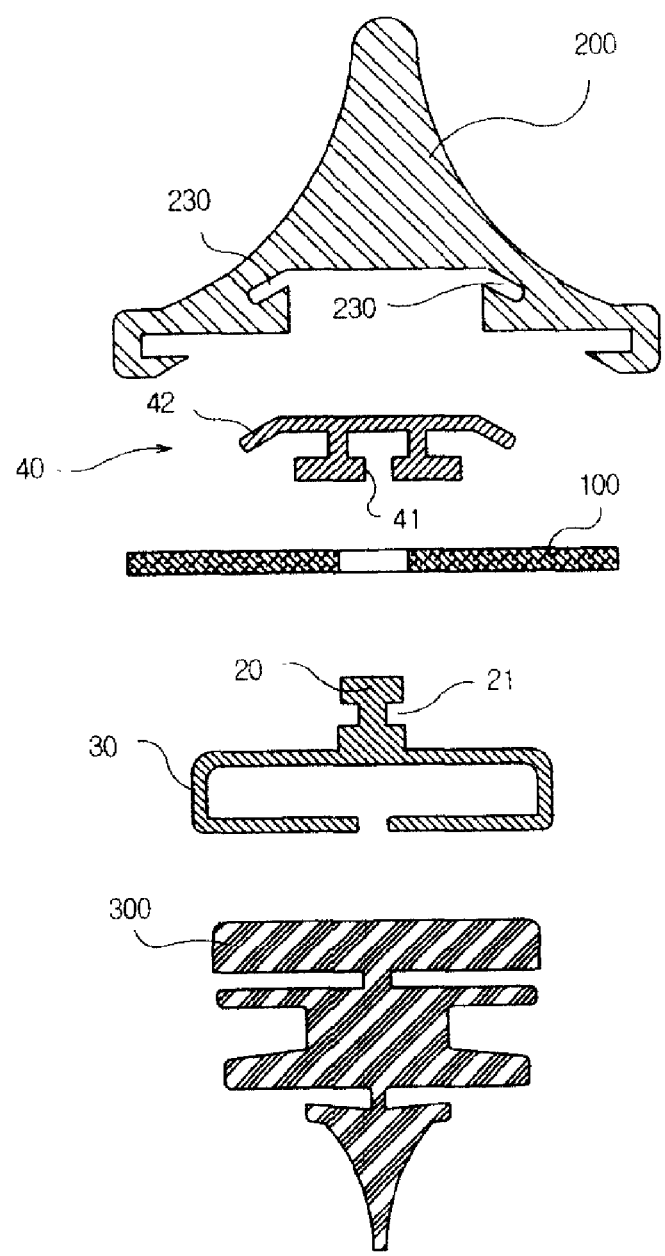

[Fig. 4]
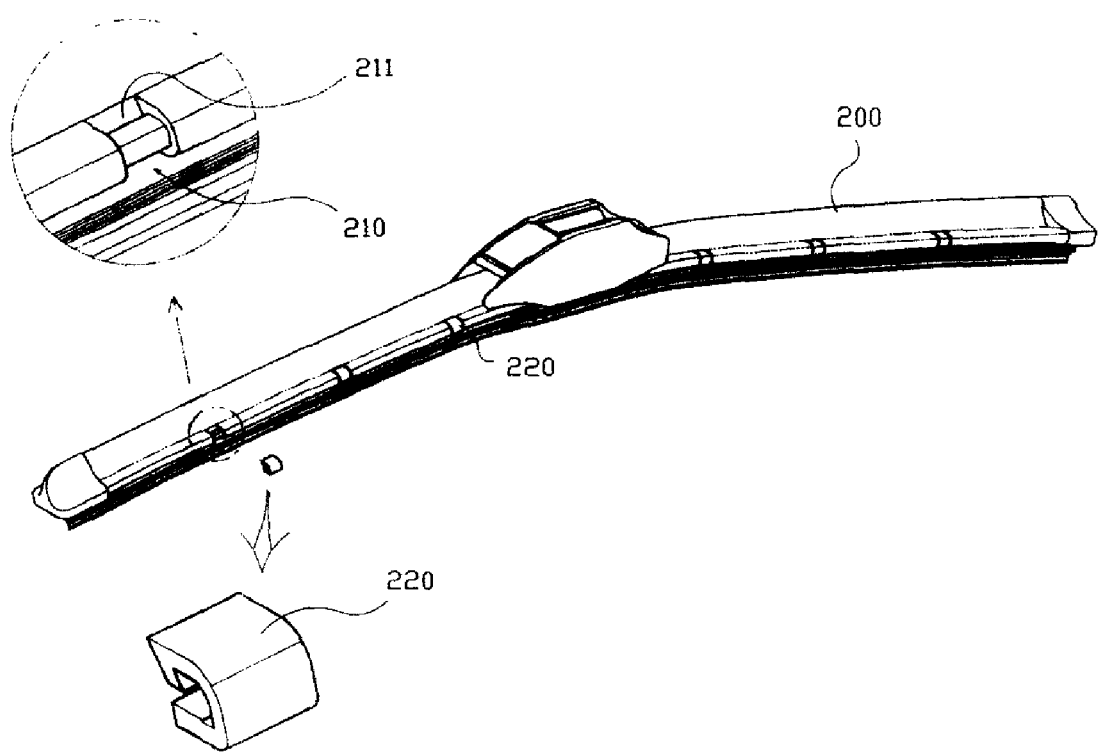

[Fig. 5]
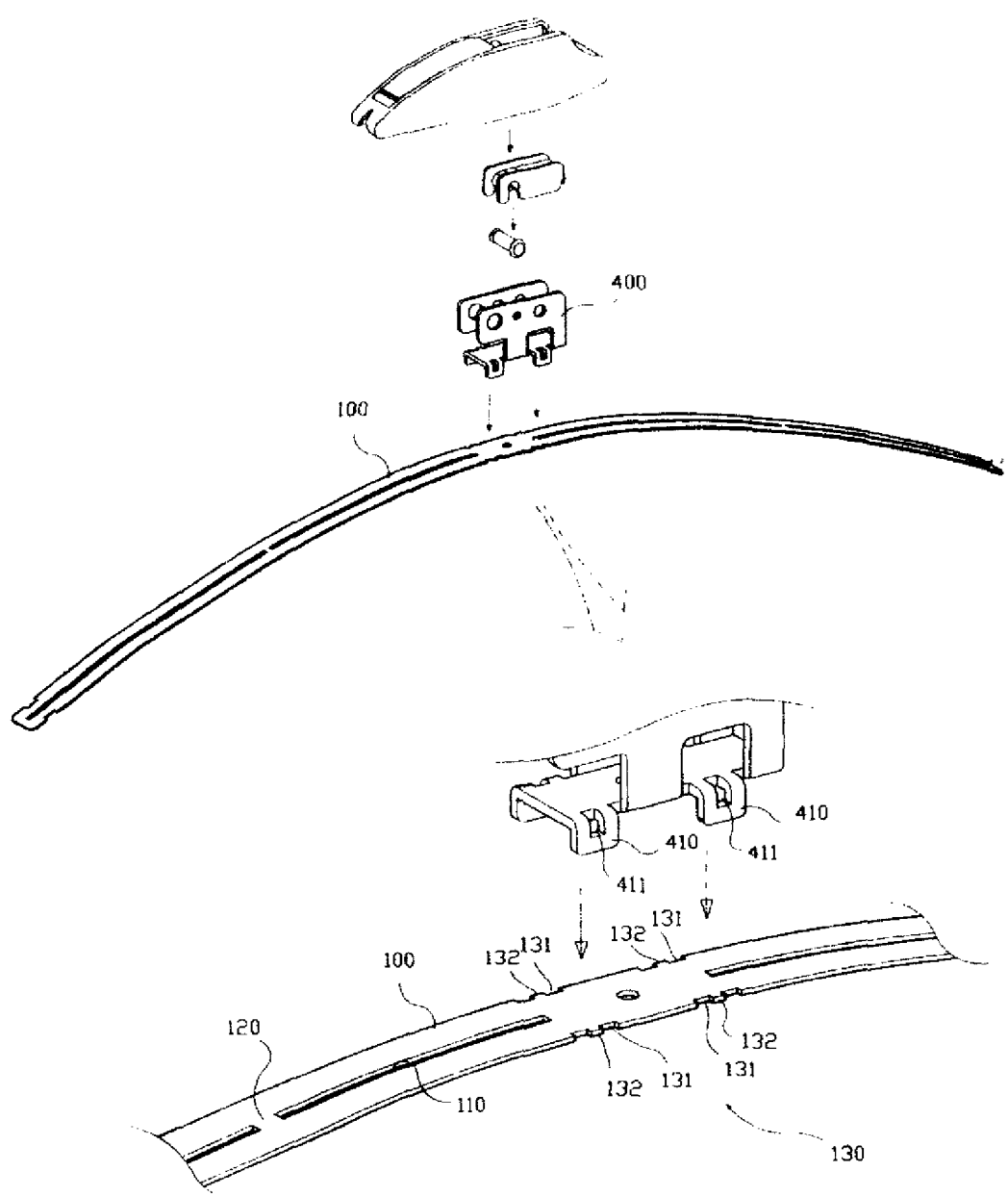

BLADE FOR WINDSHIELD WIPER OF AUTOMOBILE

TECHNICAL FIELD

This invention pertains to a windshield wiper blade apparatus for a motor vehicle that more effectively and perfectly completely clears away rainwater or and foreign objects, which stick on the car windshield, with more definite contact force and without shaking. Also, this invention is able to more clearly improve the organic combination structure of the components that constitute the blade apparatus.

BACKGROUND ART

Existing wiper blade apparatuses have problems of decreased solidity because they are made in using the structure in which two narrow rail springs that have a certain resilience and rigidity are inserted into hook grooves in both sides of the upper part of the blade or a wide rail spring is bored, making a linear hole, and then the spring is inserted into the upper part of the blade. More specifically, in those two cases where there are two narrow rail springs or where one wide rail spring is bored, making a linear hole and the blade is inserted into the spring, the rail spring may widen or narrow in the width direction. Hence, operating the wiper for a long time may lead to loose coupling in the rail spring, consequently causing the blade, which is inserted between the rail spring, and the spoiler covering the upper part of the rail spring, to become detached or damaged.

In addition, due to the configuration in which the blade, which is made of soft rubber and is a core element in the wiper blade, apparatus, is to rub the surface of the car windshield in the state where it is directly inserted into and coupled with the rail spring, there occurs serious separation between them, causing shaking while the wiper is running. Existing wiper apparatuses not only fail to maintain close contact between the blade and the windshield, but also have the insertion part of the blade, where the blade is inserted into the rail spring, often tears due to the rail spring's sharp and rigid material, which consequently causes hindrance to the perfect operation of the wiper.

In addition, because the clamp that is connected to the wiper arm is coupled with the rail springs through simple pressure and bending, which forms a weak structure, resulting in separation between the blade and the windshield while using, the separation causes shaking right and left and moreover further separation.

BRIEF DESCRIPTION OF THE DRAWINGS

FIG. 2 shows a partial view of the wiper blade constituting this Invention.

FIG. 4 is the entire perspective view showing the assembly of the clips for prevention of the spoiler from breaking away.

FIG. 5 shows an illustration of the coupling of the clamp.

Figure 1A:
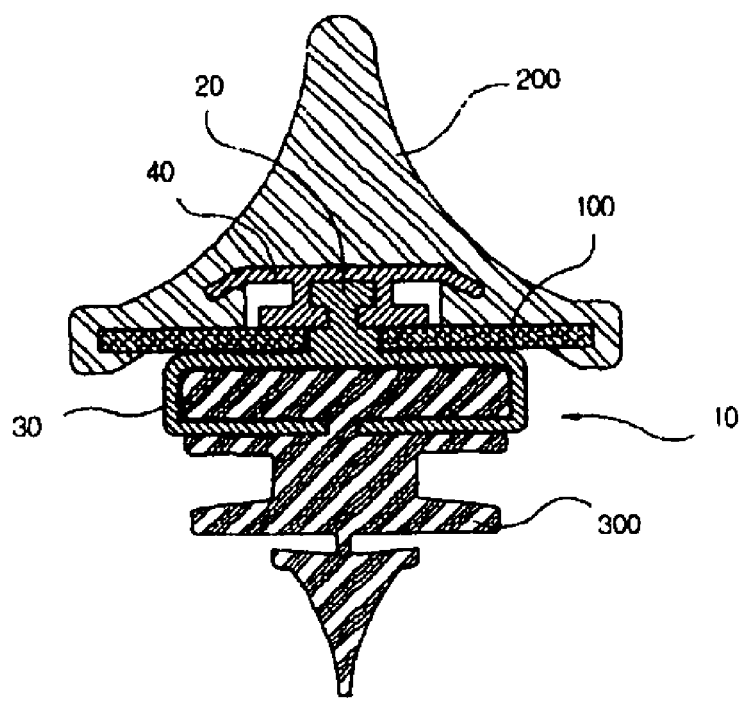
FIG. 1A shows a sectional view of the wiper blade constituting this Invention.
Figure 1B:
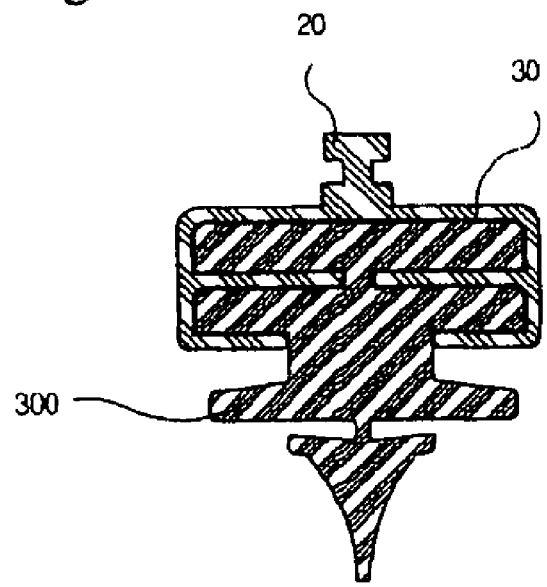
FIG. 1B shows a sectional view of the blade-coupling unit constituting this Invention.
Figure 3A:
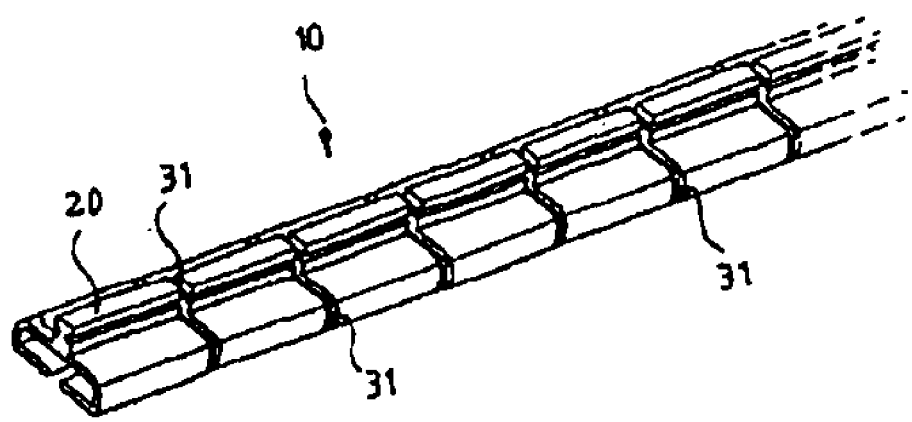
FIGS. 3A and 3B are illustrations of the blade-coupling unit constituting this Invention.
Figure 3B:
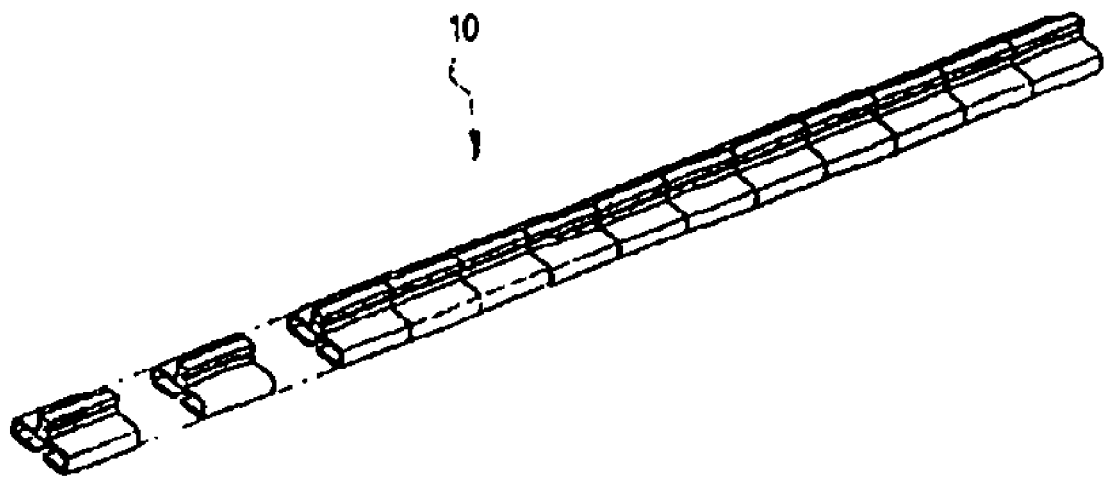

\* Explanations of sign used in the drawings \*

| | |
|---|---|
| 10: Blade C-coupling Unit | 20: Protrusion |
| 21: Insertion Groove | 30: 'ㄷ'- type loop |
| 31: Lash | 40: Wedge |
| 41: Wedge Foot | 42: Loop |
| 100: Rail Spring | 110: Linear Hole |
| 120: Reinforcing Section | 130: Clamp C-coupling Unit |
| 131: Hook Groove | 132: Hook Projection |
| 200: Spoiler | 210: Clip Installation Section |
| 211: Groove for to Prevention of the Spoiler from Breaking away Away, | 220: Clip for to Prevention of the Spoiler from Breaking away Away |
| 230: Loop Insertion Groove | 300: Blade |
| 400: Clamp | 410: Coupling Protrusion |
| 411: Hook Hole | |

DETAILED DESCRIPTION OF THE INVENTION

Technical Problem

This invention is designed to solve the aforementioned problems immanent in prior art; to produce as little separation as possible when the blade, a core element in a the wiper apparatus, is coupled with the rail spring; to have a more stable and solid structure in coupling the blade; to have a means to reinforce the rigidity that may supplement the weakness of the long groove, which is formed in the rail spring; to provide solid and effective coupling between the clamp, which is mounted in the middle of the upper rail spring, and the rail spring.

Technical Solution

In this wiper blade apparatus, it is possible to more cleanly and perfectly completely eliminate foreign objects such as snow or rainwater, which stick on the car windshield, with more definite contact force. Furthermore, its given structural solidity prevents shaking, decreases failure rate, increases the expected life span, and improves performances.

BEST MODE FOR CARRYING OUT THE INVENTION

Based on the drawings attached hereto the invention is described in more details as follows.

In order to minimize air resistance this invention has a spoiler(200) in the upper part of the rail spring, which is the skeleton of the wiper blade apparatus, A blade of soft rubber is inserted into and coupled with the lower part of the rail spring. A clamp is mounted in the middle of the upper part of the rail spring;

Note that the blade(300) is not directly inserted into the rail spring(100), but after a separate blade blade-coupling unit (10) is fixed to the rail spring(100), the blade(300) is coupled with the blade-coupling unit(10);

The invention has more than one reinforcing sections(120) in the linear holes(110) that are made by having the rail spring(100) perforated in order to hold the blade(300);

The clamp is mounted in the middle of the upper part of the rail spring(100), forming a clamp-coupling unit(130) that is composed of four coupling protrusions(410), hook holes (411), hook grooves (131), and hook projections(132), respectively, through which the clamp is more definitely tightly fixed to the rail spring by inserting each hook projection(132) in the rail spring(100) into each hook hole (411) in the clamp(400);

The invention has special devices to couple the spoiler and the rail spring. Those devices include a wedge(40), a 'ㄷ'-shape loop(30) and a loop insertion groove(230) that is formed in the spoiler, Also, the spoiler(200) has multiple clip installation sections(210) embedding grooves for prevention of the spoiler from breaking away(211) in the external sides of the 'ㄷ'-shape wings of the spoiler(200), which is assembled with the rail spring(100) through the both edges in the width direction of the rail spring(100). Multiple clips for prevention of the spoiler from breaking away(220) are fixed to the clip installation sections(210), preventing the spoiler (200) from separating, by pressing holding the spoiler(200) and part of the rail spring together(100).

From the components mentioned above, the blade-coupling unit(10) is inserted into the linear hole(110) of the rail spring(100) and includes a protrusion(20) forming the insertion groove(21). In addition, it forms a 'ㄷ'-type loop(30) in bilateral symmetry that enables it to safely and solidly clamping the blade, with being in closely contacted by with the surface of the rail spring, The wedge(40) and the blade-coupling unit(10) are coupled with each other as the wedge foot(41) of the wedge(40) is inserted into the insertion groove(21) of the blade-coupling unit(10), ensuring solid coupling with the rail spring(100).

A 'ㄷ'-type loop may be added in to the multi-tier up above and down below. In this case it may obtain a more solid coupling force.

The spoiler(200), which is installed to on the upper part of the rail spring(100), forms the loop insertion grooves(230) at both sides of its bottom both sides. In the meantime, the wedge(40) forms loops(42) at both edges of its upper part so as to be inserted into the loop insertion grooves(230). Assembling like this will improve not only the coupling force in the blade-coupling unit(10), but also the coupling force in the spoiler(200), providing a double advantages.

As the rail spring(100) should have resilience in parallel with the curvature of the car's front windshield, the blade-coupling unit (10) is also required to have resilience. In order to do so, it is possible to equally divide the blade-coupling unit into specific short parts so as to act in concert with the resilience of the rail spring(100). Moreover, the required resilience may be secured sufficiently by forming lashes(31) from the top of the protrusion(20) to a specific depth in the 'ㄷ'-type loop(30) of the blade-coupling unit (10).

As described above, in this invention the blade is not directly inserted into the rail spring. It may be molded into various materials and shapes. Furthermore, it is coupled through the blade-coupling unit that is perfectly in close contact with the bottom surface of the rail spring. This structure enables smooth operation of the wiper without separation (between the blade and windshield) or shaking and is the main element that greatly contributes to the an improvement of in the wiper performance.

Making more than one reinforcing sections in the linear holes that are made by having the rail spring perforated for the purpose of bonding holding the blade will greatly contribute to improving the structural weakness of the rail spring, which is the skeleton of the wiper blade apparatus. Making linear holes in the rail spring that are unnecessarily long weakens the coupling force of the rail spring, leading to the structural weakness of the entire wiper. Accordingly, supplementing this weakness is essential to improve the quality. However, since prior arts show a structure in which it is possible to make a specific space in the rail spring and to insert the upper part of blade into it, it is impossible to use other reinforcing means.

In addition, in the course of coupling the clamp to the middle of the upper part in the length direction of the rail spring, this invention utilizes the clamp-coupling unit by making hook grooves in both sides of the width direction of the rail spring and by making coupling protrusions in the both sides of the lower part of the clamp so as to be coupled with the hook grooves and hook projections in the rail spring. This structure maintains perfect coupling even though the coupling between the clamp and the rail spring becomes loose more or less while in use.

It is impossible to completely release all the worry about of the spoiler breaking away of the spoiler due to shock, which may occur while in use, or recurring vibration and shaking that may occur in a long time use, only with just the basic coupling between the rail spring and the spoiler. In contrast, since this invention has multiple clip installation sections embedding 'grooves for to prevention of the spoiler breaking away' in the external sides of the 'ㄷ'-type shape wings of the spoiler, which is assembled with the rail spring through the both edges in the width direction of the rail spring, and multiple 'clips for to prevention of the spoiler breaking away', which are fixed to the clip installation sections, preventing the spoiler from separating, by pressing holding the spoiler and part of the rail spring together. In other words, this invention is characterized by the creation of a separate means method to prevent the spoiler from breaking away regardless of the weak material of the spoiler, in addition to the basic coupling means.

What is claimed is:

1. A wiper blade apparatus comprising: a spoiler(200) to minimize air resistance in an upper part; a blade (300) of soft rubber in a lower part; a rail spring (100) in a middle part; and a clamp(400) to be mounted in middle of the said rail spring (100), wherein the said blade(300) is coupled with a blade-coupling unit(10) after fixing the said unit(10) to the said rail spring (100), further comprising more than one reinforcing sections (120) in linear holes(110) that are made by having the rail spring (100) perforated, wherein the clamp comprises four coupling protrusions (410) and hook holes(411), respectively, wherein the rail spring comprises four hook grooves(131) and hook projections(132) respectively, further comprising multiple clip installation sections (210) embedding grooves for prevention of the spoiler from breaking away(211) in external sides of 'ㄷ'-shape wings of the spoiler and multiple clips for prevention of the spoiler from breaking away(220), which are fixed to the said clip installation sections, preventing the spoiler from separating, by pressing holding the spoiler and part of the rail spring together.

2. The wiper blade apparatus of claim 1, wherein the blade-coupling unit(10) is inserted into the linear holes(110) of the rail spring(100) and includes a protrusion(20) forming an insertion groove(21), wherein a wedge(40) and the blade-coupling unit(10) are coupled with each other as a wedge foot(41) of the wedge(40) is inserted into the insertion groove (21) of the blade-coupling unit(10) ensuring solid coupling with the rail spring.

3. The wiper blade apparatus of claim 2 comprising a 'ㄷ'-shape loop(30) for the blade-coupling unit (10) in bilateral symmetry, which enables the blade to be clamped safely and solidly the loop being closely contacted by with the surface of the rail spring.

4. The wiper blade apparatus of claim 3, wherein the blade-coupling unit(10) is equally divided and arrayed in specific short parts so as to act in concert with the resilience of the rail spring.

5. The wiper blade apparatus of claim 3, wherein resilience may be secured sufficiently in the coupling unit (10) by forming lashes(31) from a top of the protrusion(20) to a specific depth in the 'ㄷ'-shape loop(30) of the blade-coupling unit (10).

6. The wiper blade apparatus of claim 2, wherein the blade-coupling unit(10) is equally divided and arrayed in specific short parts so as to act in concert with the resilience of the rail spring.

7. The wiper blade apparatus of claim 2, wherein resilience may be secured sufficiently in the coupling unit (10) by forming lashes(31) from a top of the protrusion(20) to a specific depth in a 'ㄷ'-shape loop(30) of the blade-coupling unit(10).

8. The wiper blade apparatus of claim 1, wherein the spoiler(200), which is installed on an upper part of the rail spring(100), forms loop insertion grooves(230) at both sides of its bottom and a wedge(40) forms loops(42) at both edges of an upper part thereof so as to be inserted into the loop insertion grooves (230).

* * * * *